July 17, 1956 F. KRAHULEC ET AL 2,755,162

RECORDING APPARATUS FOR RECORDING THE LISTENING HABITS OF WAVE SIGNAL RECEIVER USERS

Filed March 2, 1950 3 Sheets-Sheet 1

INVENTORS.
Fred Krahulec,
Robert L. Freeman,
Henry A. Rahmel,
By Mason, Kolehmainen, Rathburn and Wyss
Attys.

INVENTORS.
Fred Krahulec
Robert L. Freeman
Henry A. Rahmel.
By Mason, Kolehmainen, Rathburn and Wyss Atty's INVENTORS.
Fred Krahulec,
Robert L. Freeman,
Henry A. Rahmel,
By Mason, Kolehmainen, Rathburn & Wyss Attys.

United States Patent Office 2,755,162

Patented July 17, 1956

2,755,162

RECORDING APPARATUS FOR RECORDING THE LISTENING HABITS OF WAVE SIGNAL RECEIVER USERS

Fred Krahulec, Skokie, and Henry A. Rahmel and Robert L. Freeman, Evanston, Ill., assignors to A. C. Nielsen Company, Chicago, Ill., a corporation of Illinois Application March 2, 1950, Serial No. 147,304

5 Claims. (Cl. 346—37)

The present invention relates to a system and apparatus for recording the listening habits, or viewing habits in the case of television, of wave signal receiver users. Specifically the present invention is in the nature of an improvement on the arrangement disclosed and claimed in copending Rahmel application Serial No. 762,962, filed July 23, 1947 and is closely allied with copending application, Serial No. 147,302, Krahulec, and Serial No. 147,303—Rahmel filed concurrently herewith.

Instrumented methods of determining the listening habits, or viewing habits in the case of television, of wave signal receiver users generally comprises the use of a recording device operating in conjunction with one or more receivers in the home of each collaborator to record as a function of time the wave signal transmitters to which the receiver is tuned for signal reception, whereupon this recorded information is made available to an analysis or research organization for conversion to useable data with reference to radio advertising and the like. The usual device of this character embodies facilities for driving a recording element such as a recording tape or the like at a constant speed and recording on this tape the various stations to which the receiver is tuned. In one recording arrangement extensively used heretofore the positions of the record indications transversely of the tape are representative of the particular stations to which the associated receiver or receivers are tuned.

For the purpose of eliminating a substantial cost factor in the sampling process of getting the recorded information to the analysis organization at regular and frequent intervals, it has been suggested to employ mailable magazines containing the recording element which magazines can readily be associated with or removed from the recorder by the collaborator. By having the collaborator replace the magazines and mail them directly to the analysis organization a substantial cost reduction in the form of salaries and expenses for field men is obtained, particularly when such recording devices are disposed in widely scattered areas. As has been pointed out in the above mentioned copending Rahmel application, where mailable magazines are employed it is essential that some independent and more or less foolproof time information be applied to the record while it is being made, which time information will permit the analysis organization accurately to orientate the record with respect to a predetermined calendar period. It would be desirable to provide an improved recording device and apparatus for recording the desired record information in a manner which lends itself more completely to automatic operation. Such automatic operation might comprise among other things automatic devices for converting information recorded on the recording element to information which can be directly fed to digital computing machines such as electronic computers or the like. It would furthermore be desirable to supply the record information to the recording element in a manner such that it may also be read with speed and ease with conventional means. It will be apparent that having recording indications transversely of a record tape, the positions of which are indicative of the station to which the receiver is tuned does not lead itself readily to automatic reading and accordingly it would be desirable to provide an arrangement of recording such information which would more readily lend itself to automatic decoding.

Accordingly, it is an object of the present invention to provide a new and improved system and apparatus for recording the listening or viewing habits of wave signal receiver users.

It is another object of the present invention to provide a new and improved method of recording in a recording device of the type referred to above.

It is a further object of the present invention to provide a new and improved recording device in which record information is applied to a recording element in the form of a simple binary code which can readily be read by automatic decoding apparatus and which at the same time can be visually read in a simple manner whereby one can tell at a glance what the tuning condition of the monitored receiver has been.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Figs. 1*a* and 1*b* together are a schematic representation of a complete system embodying the present invention;

It will be understood that various features of the present invention are applicable to various systems and apparatus employed heretofore for determining the listening or viewing habits of a radio or television audience. For the purpose of illustrating the present invention it has been shown as applied to a particular type of system in which the recording apparatus is generally disposed at a position not too far removed from the wave signal receiver being monitored, a cable interconnection being provided. It should be understood, however, that many features of the present invention are readily applicable to a system in which the recording device is disposed remotely from the receiver and may be in an entirely different room or even on a different floor of the collaborator's home, the recorder being commonly located in a closet or basement of the home whereas the receiver may be disposed in any desired room of the home.

Figure 1A:
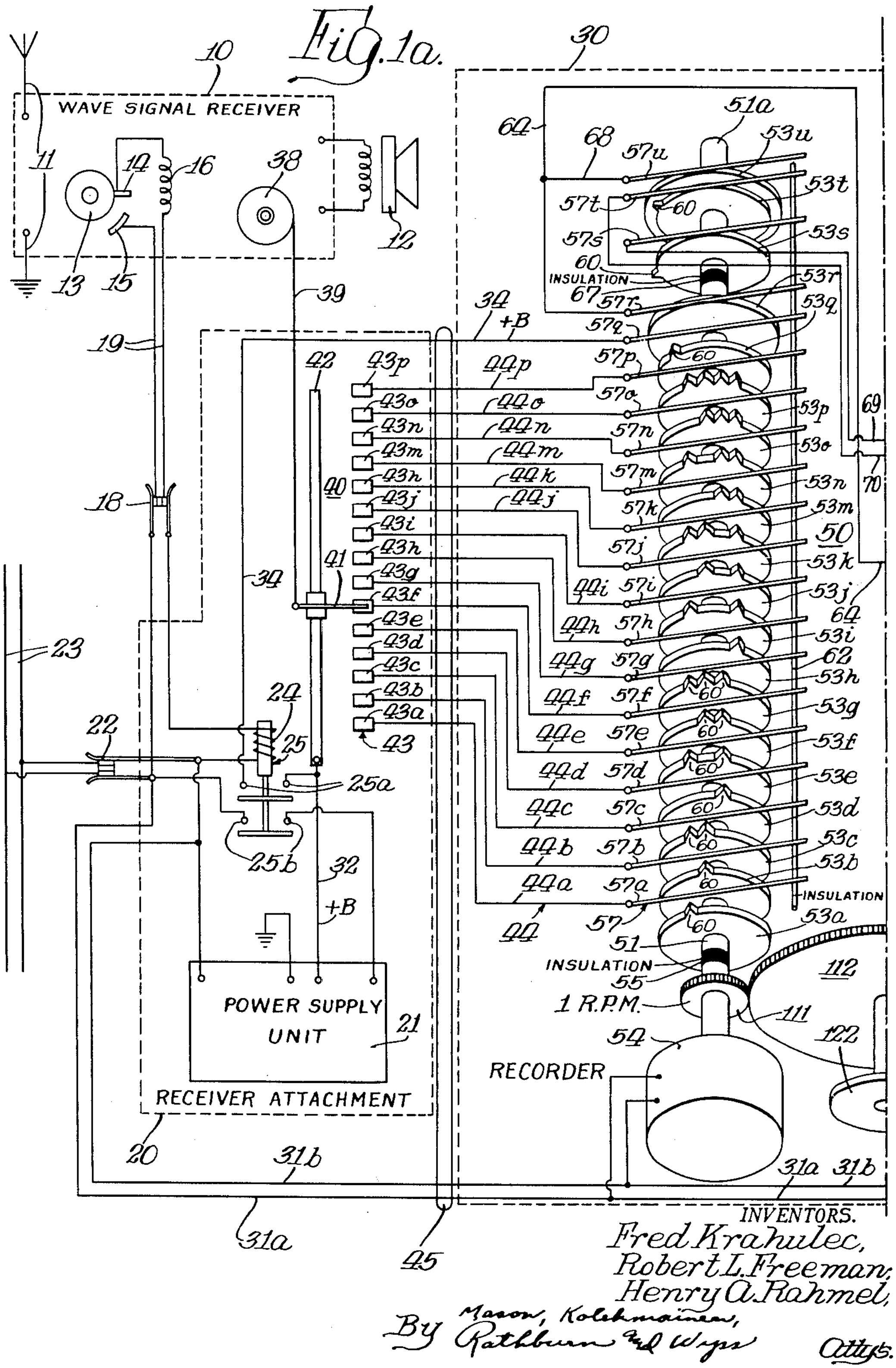
Figure 1B:
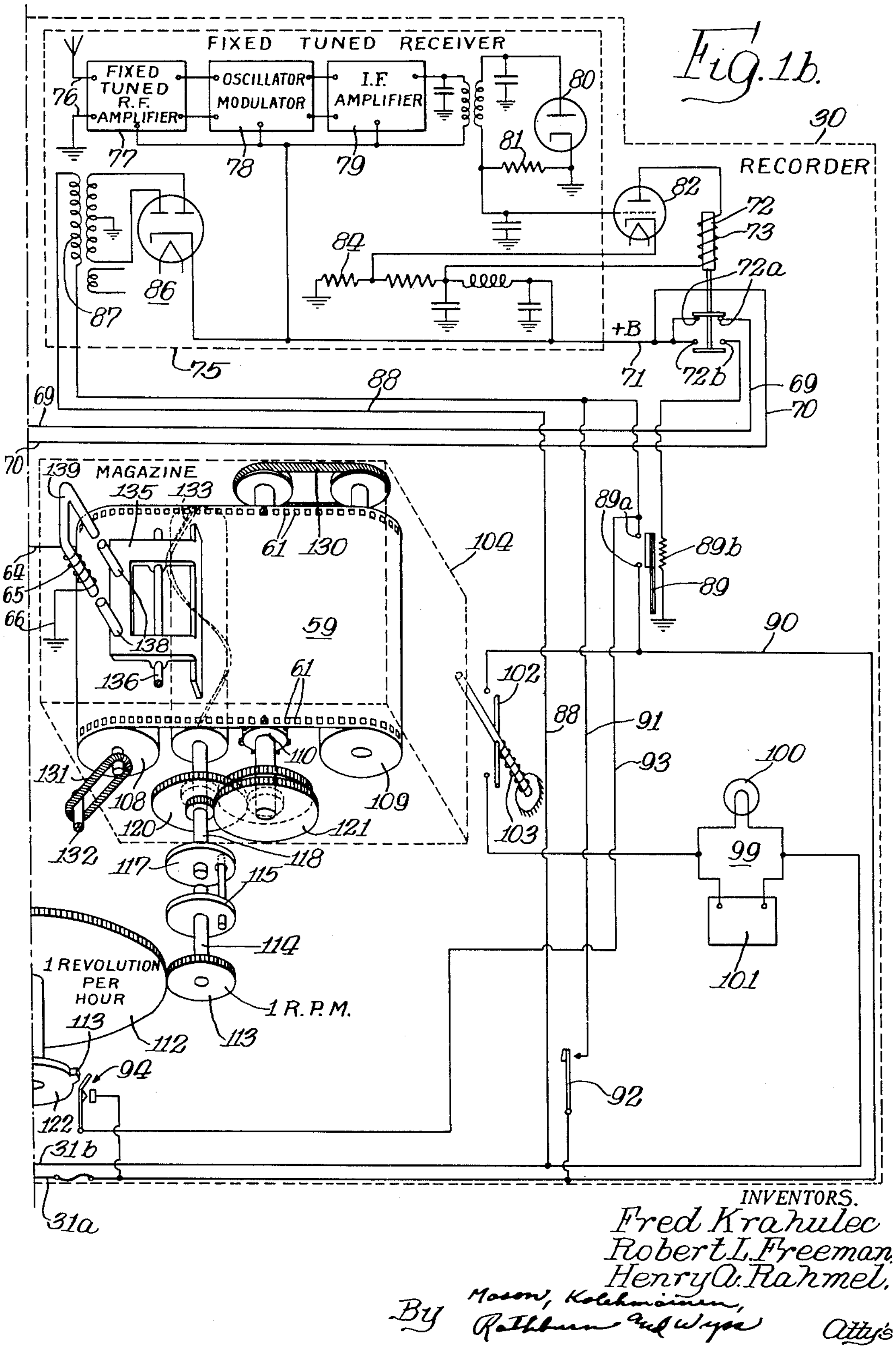

Referring now to Figs. 1*a* and 1*b* of the drawings, which should be treated as a single figure, there is disclosed a wave signal receiver specifically designated at 10, which receiver may be of any type whether it be a receiver for amplitude modulated or frequency modulated program signals or whether the signals are eventually converted to visible or audible form or both. The wave signal receiver 10, only very schematically shown, is illustrated as comprising an antenna ground circuit 11 serving as the input of the receiver, and a signal reproducer schematically designated as a loud speaker 12 serving as the output of the receiver 10. It will be understood that the signal reproducer 12 might equally well comprise a fluorescent screen or similar apparatus. Interposed between the antenna ground circuit 11 and the signal reproducer 12 are, of course, the usual stages of a wave signal receiver, not shown, which might comprise a tunable radio frequency amplifier, a mixer or modulator, an intermediate frequency amplifier, a detector, and in the case of a conventional radio receiver, an audio frequency amplifier and the like. Since the receiver 10 is representative of any conventional wave signal receiver whether it be a radio receiver or a television receiver, its mode of operation will be readily apparent to those skilled in the art and consequently no further discussion thereof is included in this application.

It will be understood that the wave signal receiver 10 conventionally comprises an on-off switch, specifically illustrated as comprising a manually operable knob 13 for controlling relatively movable switch contacts 14 and 15. Such a manually operable control device in the nature of a control switch for the wave signal receiver is often combined with a manual volume control device. As illustrated, the manual control switch comprising the contacts 14 and 15 is connected in series with the primary winding 16 of a power supply transformer across a source of potential such as the conventional house wiring circuit. A conventional plug connector 18 is illustrated as comprising the terminus of the power cord 19, and the flow of current therethrough is controlled by the switch comprising contacts 14 and 15.

It will be apparent to those skilled in the art that there must be obtained from the wave signal receiver being monitored, such as 10, a response of some sort indicative of the tuning condition of the receiver. This response may, of course, be an electrical response of some sort. If a superheterodyne receiver is being monitored it will be understood that the output of the local oscillator will have a frequency indicative of the tuning condition of the receiver. The response might also be mechanical as for example the physical position of the resonant frequency varying means or in other words, the position of the tuning shaft of the variable condensers, or the position of the cores of permeability tuned devices. Since 85 to 90% of the wave signal receivers available on the market today permit of readily obtaining a mechanical response indicative of the tuning condition of the receiver, the present invention has been illustrated with an arrangement for producing such a mechanical response.

To this end there is associated with the wave signal receiver 10, a receiver attachment generally designated at 20, which comprises a power supply unit 21 connected through a plug connector 22 with a source of alternating current potential 23. Preferably and as illustrated, the plug connector 18 of the wave signal receiver 10 is connected to the power source 23 through the receiver attachment 20, since with this feature the apparatus for recording wave signal receiver use may be applied to a receiver merely by disconnecting the receiver from the power source and connecting it to the receiver attachment which in turn is connected to the power source so as effectively to include the winding 24 of a series relay 25 in series with the power cord 19 of the wave signal receiver 10.

The power source 23 supplies alternating current power to an associated recorder generally designated at 30 through a pair of conductors specifically designated as **31*a* and 31*b*. The power supply unit 21 also includes means for rectifying the alternating current so that a conductor 32 extending from the power supply unit 21 is effectively a source of direct current potential designated as a source of +B potential which is supplied directly to the recorder 30 through the contacts 25*a* of the relay 25 and a conductor 34. The series relay 25 also comprises a pair of normally open contacts 25*b* which control the supply of alternating potential from the source 23 to the power supply unit 21. Until the control switch of the receiver 10 is closed so that current may flow through the winding 24 of the series relay 25 to close the contacts 25*a* and 25*b*, no +B potential is available at the power supply unit 21**.

From the above description it will be apparent that when the wave signal receiver 10 is turned on sufficient current will flow through the winding 24 of the series relay 25 to cause it to pick up and close its normally open contacts **25*a* and 25*b* whereupon a +B potential is rendered available at the receiver attachment 20**.

As was mentioned above the receiver attachment 20 is provided with mechanical means for converting a response or characteristic of the receiver 10 to an indication at the receiver unit 20 of the tuning condition thereof. To this end a portion of the receiver 10 specifically designated as 38, which may for example comprise the tuning knob of the receiver and consequently is indicative of the tuning condition of the receiver, is connected by mechanical links such as a Bowden wire 39 to a position switch generally designated at 40 which is preferably of the rotary type disclosed in Fig. 4 of the drawings and disclosed and claimed in copending Krahulec application, Serial No. 78,926 filed March 1, 1949 and assigned to the same assignee as the present application. As illustrated in Fig. 1*a* the position switch 40 is illustrated as comprising a linearly movable contact 41 adapted electrically to interconnect an elongated stationary contact 42 with one of a plurality of spaced contacts 43, and specifically designated as **43*a*, 43*b*, 43*c*, 43*d*, 43*e*, 43*f*, 43*g*, 43*h*, 43*i*, 43*j*, 43*k*, 43*m*, 43*n*, 43*o* and 43*p* respectively. The movable contact 41 is connected to the mechanical link 39 so as to assume a position in registry with one of the movable contacts 43 depending upon the particular tuning position of the receiver 38. Since fifteen contacts are illustrated, it will be apparent that the position switch 40 is capable of indicating fifteen different transmitting stations to which the wave signal receiver 10 may be tuned. The elongated stationary contact 42 is connected directly to the conductor 32 and consequently directly to a source of +B potential. The stationary contacts 43 are connected each to a different one of a plurality of conductors specifically designated as 44 each marked with a subscript corresponding to the subscript of the associated contact 43 to which the conductor 44** is connected.

The specific embodiment of the present invention has been termed above as a cable connected arrangement and the reason for this designation is because the receiver attachment 20 and the recorder 30 are interconnected by a cable 45 which includes the conductors **31*a*, 31*b*, 34, as well as the plurality of conductors 44** schematically represented in Fig. 1*a* of the drawings by a loop encircling all these conductors.

From the above described arrangement it will be apparent that the mechanical position of the tuning portion of the wave signal receiver 10 is capable of being indicated as electrical responses by rendering effective different ones of the plurality of contacts 43 which contacts are in turn connected by means of the cable 45 with the recorder 30. For the purpose of converting the electrical response of the position switch 40 indicative of the mechanical positioning of the tuning apparatus of the wave signal receiver 10 to a readily recordable and decodable response there is provided in the recorder 30 a code commutator switch generally designated at 50, which switch 50 is preferably of the type disclosed and claimed in the above mentioned copending Krahulec application, Serial No. 78,926. As illustrated schematically the code commutator switch 50 is a rotary switch comprising a rotatable shaft 51 upon which are mounted a plurality of contact cams **53*a*, 53*b*, 53*c*, 53*d*, 53*e*, 53*f*, 53*g*, 53*h*, 53*i*, 53*j*, 53*k*, 53*m*, 53*n*, 53*o*, 53*p*, 53*q*, 53*r***.

53s, 53t, and 53u. As illustrated the shaft 51 is adapted to be rotated preferably at one R. P. M. by means of a suitable motor generally designated at 54 connected to the conductors 31a and 31b which comprise the alternating current source. The motor 54 is preferably a synchronous motor combined with a suitable gear train unit for reducing the synchronous motor speed to a constant driving speed of one revolution per minute. Preferably the driving means interposed between the shaft 51 and the motor includes a section of insulating material 55 to isolate the conducting shaft 51 from the driving means therefor. Associated with the contact cams 53a to 53u are a plurality of relatively stationary contact fingers 57 each specifically designated with the subscript of the particular cam with which the relatively stationary contact fingers are associated.

Figures 2, 3, 4:
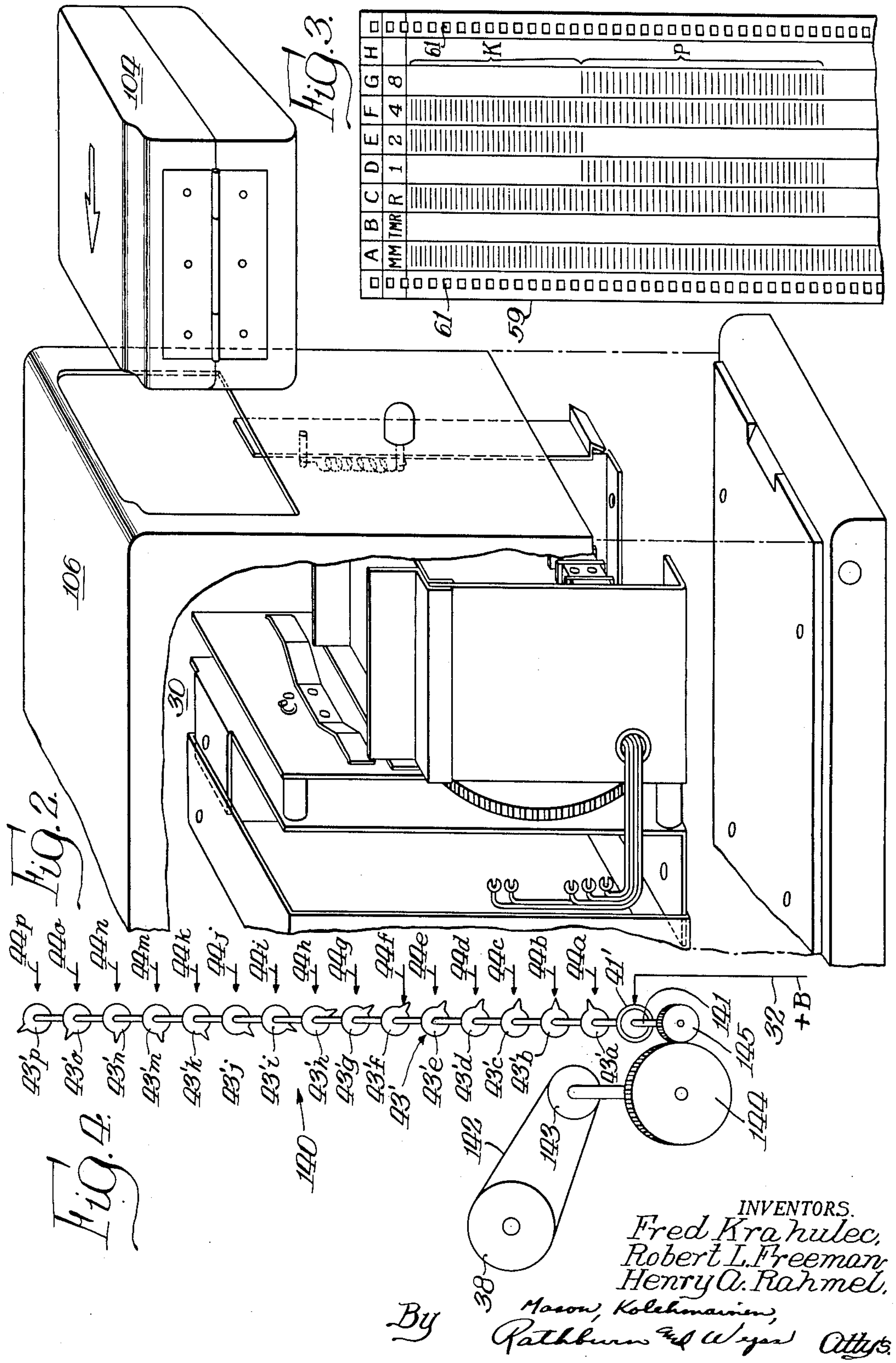
Fig. 2 is a perspective, partially exploded view, with portions cut away, of a recorder embodying the present invention and schematically indicated in Figs. 1*a* and 1*b* of the drawings.
Fig. 3 is an enlarged fragment of a representative recording element illustrating a typical record which might appear thereon.
Fig. 4 is a schematic diagram of a modified position switch of the rotary type.

In order to record readily decodable record indications of the transmitting stations to which the receiver 10 is tuned in a minimum space across a record receiving element such as 59 employed in the recorder 30 and a fragment of which is shown in Fig. 3 of the drawings, there is employed in accordance with the present invention a method of coding utilizing a "binary code" found to be especially satisfactory and which lends itself to high speed decoding. By employing such a binary code only four angular positions of the code commutator switch 50 need be used to code fifteen separate tuning channels or transmitting stations to which the wave signal receiver 10 might be tuned. This means that only four positions across the record receiving element 59 are needed to indicate tuning to such fifteen transmitting stations. To this end the cams 53a, 53b, 53c, 53d, 53e, 53f, 53g, 53h, 53i, 53j, 53k, 53m, 53n, 53o and 53p are provided with various combinations of raised contact portions 60 all confined within four angular positions of the shaft 51. Cam 53a is provided with a single raised contact portion 60 in a first of these four positions; contact 53b is provided with a single raised contact portion 60 in a second of these four angular positions; contact 53c is provided with two raised contact portions 60, one in the first angular position and one in the second angular position; etc. As illustrated in the drawings, the combination of raised contact portions in only four angular cam positions to produce fifteen different code combinations is tabulated in the following table:

| Station No. | Cam | Raised Contact Portion in the Following Position or Positions |
|---|---|---|
| 1 | 53a | 1 |
| 2 | 53b | 2 |
| 3 | 53c | 1—2 |
| 4 | 53d | 3 |
| 5 | 53e | 1—3 |
| 6 | 53f | 2—3 |
| 7 | 53g | 1—2—3 |
| 8 | 53h | 4 |
| 9 | 53i | 1—4 |
| 10 | 53j | 2—4 |
| 11 | 53k | 1—2—4 |
| 12 | 53m | 3—4 |
| 13 | 53n | 1—3—4 |
| 14 | 53o | 2—3—4 |
| 15 | 53p | 1—2—3—4 |

The binary code type of basic record which requires only four positions acrosss a record receiving element to record fifteen separate tuning channels can best be understood by reference to Fig. 3 of the drawings where the record receiving element 59 is indicated as comprising sprocket holes 61 along either edge thereof between which are defined a plurality of channels or transverse positions specifically designated as A, B, C, D, E, F, G, and H respectively. Actually the record receiving element 59 may be provided with a great many additional channels such as twenty or more, but the small number indicated serves the purpose of illustrating the present invention and makes it easier to appreciate the record indications than if the large number of channels which actually could be accommodated were shown. When a large number of channels are employed, as is usually the case, and as is fully disclosed in the copending Krahulec application, filed concurrently herewith, Serial No. 147,302 then the device lends itself to recording the tuning condition of a plurality of wave signal receivers, such as 10 on a single record receiving element, such as 59. For the purpose of illustrating the "binary code" aspect of the present invention, however, only the channels or transverse positions, D, E, F and G on the element 59 are required, namely four transverse positions in which the tuning condition to fifteen separate transmitters may be recorded. The first of these, namely position D in accordance with the present invention is assigned a code number of one; the second, namely position E is assigned a code number of two; the third, namely position F is assigned a code number of four and the fourth, namely position G is assigned a code number of eight. The presence or absence of code marks in these four positions will permit fifteen different combinations with each combination equal to the sum of the code numbers with which the code marks are associated. Thus, the number of the station to which the receiver 10 is tuned is determined by the sum of the code numbers associated with the respective positions on the record receiving element 59 in which code marks are produced. If code marks are produced in positions E and F, assigned code numbers two and four respectively, as indicated on the portion K of the record receiving element 59, then the station to which the receiver 10 is tuned is station number six. In the portion of the record receiving element 59 designated as P, it will be observed that code marks appear in positions D, F and G having code numbers one, four and eight, respectively, the sum of which is thirteen indicating that wave signal receiver 10 is tuned to station thirteen. For fifteen stations this may be tabulated as follows:

| Station Number to Which Receiver 10 is Tuned | Code Number or Numbers of Positions on Element 59 in Which a Code Mark Appears |
|---|---|
| 1 | 1. |
| 2 | 2. |
| 3 | 1 and 2. |
| 4 | 4. |
| 5 | 1 and 4. |
| 6 | 2 and 4. |
| 7 | 1, 2 and 4. |
| 8 | 8. |
| 9 | 1 and 8. |
| 10 | 2 and 8. |
| 11 | 1, 2 and 8. |
| 12 | 4 and 8. |
| 13 | 1, 4 and 8. |
| 14 | 2, 4 and 8. |
| 15 | 1, 2, 4 and 8. |

Thus by using four positions on the recording element 59, tuning to fifteen separate channels or transmitters can be recorded for any particular receiver and an additional transverse position can be employed to indicate whether or not the receiver is turned on or not so as to afford information as to whether the receiver is tuned to stations other than the fifteen channels for which record indications are available. It is understood that if the recorded information indicates that the receiver is tuned for a substantial portion of time to stations other than the fifteen channels provided, that some of these other stations should be included in the fifteen channels. Otherwise a significant amount of listening or viewing is not recorded.

As illustrated in the drawings, the cam 53q is provided with a raised portion 60 in a fifth angular position of the shaft 51 which may be employed to produce code marks in the position C on element 59 to give an indication of whether or not receiver 10 is turned on. If code marks appear in position C on element 59, and no code marks appear in either one or more of positions D, E, F and G then receiver 10 is tuned to a station other than one of the fifteen provided for by the position switch 40. The resilient contact finger 57*q* associated with cam 53*q* is connected to the conductor 34 which is supplied with +B potential when relay 25 is energized.

The cams 53 are arranged so as to make contact with their associated contact fingers 57 only when the raised portions 60 are in predetermined positions with respect to such contact fingers 57. To this end an insulating member 62 is provided which is disposed so as to maintain normally the contact fingers 57 in a predetermined position out of engagement with the main body portion of the cams 53. Only when the raised portions 60 of the cams 53 engage the contact fingers 57 is electrical contact made between the cams and the associated contact fingers 57. The inherent resilience of the contact fingers 57 is relied upon to insure engagement of the contact fingers with the cams to produce the desired binary code patterns. The resilient contact fingers 57*a*, 57*b*, 57*c*, 57*d*, 57*e*, 57*f*, 57*g*, 57*h*, 57*i*, 57*j*, 57*k*, 57*m*, 57*n*, 57*o* and 57*p* are connected to the contacts 43*a*, 43*b*, 43*c*, 43*d*, 43*e*, 43*f*, 43*g*, 43*h*, 43*i*, 43*j*, 43*k*, 43*m*, 43*n*, 43*o* and 43*p* respectively, whereby a +B potential from conductor 32 is selectively applied to one of these resilient contact fingers depending on the position of member 41 of position switch 40.

For the purpose of causing any electrical response, produced by virtue of rotation of the rotary switch 50, to be converted to a recording impulse of recorder 30, the cam 53*r* is preferably of a size to make continuous contact with its resilient contact finger 57*r* at least for all times that any of the contact fingers 57*a* to 57*q* are electrically engaged by their associated cams 53. This contact finger 57*r* is connected by means of conductor 64 with one terminal of a suitable control winding 65 to be described in greater detail hereinafter which control winding 65 has the other terminal thereof connected to ground as indicated at 66. It will be apparent therefore, that a plurality of selective circuits are provided between the source of +B potential represented by the conductor 32 and the control winding 65, the particular circuits being effective depending upon the position of the movable contact 41 of the position switch 40. The circuit including conductor 34 is effective whenever relay 25 is energized. For the particular position of the movable contact 41 of the position switch 40, illustrated in Fig. 1*a* of the drawing, it will be apparent that when the receiver 10 is turned on so that a source of +B potential is available at the conductor 32, current will flow through conductor 34 and consequently winding 65 whenever resilient contact finger 57*q* engages the raised section 60 of cam 53*q*, and through conductor 44*f* and winding 65 whenever resilient contact finger 57*f* engages either one of the two raised portions 60 of contact cam 53*f*. It will furthermore be apparent that under these conditions the energization of the winding 65 will perform certain control functions described hereinafter.

The motor 54, as illustrated, is continuously connected to the source of potential 23, so as to continuously rotate the coding switch 50 regardless of the condition of the wave signal receiver 10. It will be understood that in addition to producing electrical responses indicative of the station to which the receiver 10 is tuned and also dependent upon whether or not the receiver 10 is turned on or off it is desirable to record certain other information pertinent to the listening habits of wave signal receiver users. If the record receiving element 59 is moved in some predetermined manner with respect to time, such, for example, as at constant speed, then a record of the tuning condition of the receiver 10 will be obtained as a function of time. However, as has been pointed out above if the recording element is disposed in a mailable magazine which is periodically replaced it is essential that some time information be automatically applied which will permit the analysis organization to orientate the recording element with respect to time in any predetermined calendar period. As has been pointed out in the above mentioned copending Rahmel application, a very satisfactory means of accomplishing this comprises the employment of a "time mark radio" which causes a recording to be made of the "sign off" or "sign on" time or both of a particular transmitting station in the area where the collaborator's home is located. These times vary slightly from day to day and often substantially on week ends to produce a unique time pattern. In addition to recording such time information it is also desirable to provide accurate time information minute by minute for use as a reference in decoding the recorded information. Accordingly the shaft 51 of the coding switch 50 is provided with an extension 51*a* insulated from the main portion of the shaft 51 by an insulating section 67. This portion 51*a* of the shaft 51 supports the contact cams 53*s*, 53*t*, and 53*u*.

The contact cam 53*u* should be designated as a wiper cam for the cams associated with the shaft section 51*a*, and is illustrated as in continuous electrical engagement with its associated contact finger 57*u* which is connected by the conductor 68 to the conductor 64 also associated with the resilient contact arm 57*r* associated with the wiper cam 53*r*. The contact arms 53*s* and 53*t* are respectively "minute mark," designated as MM, and "time mark radio" designated as TMR, cams and are each provided with a raised contact portion 60. The contact cam 53*t* has its raised contact portion 60 disposed in a sixth angular position of the shaft 51 next adjacent the fifth angular position of the raised portion 60 of cam 53*q* so as to provide record indications in the transverse position or channel B on record receiving element 59 designated as TMR. Similarly the contact cam 53*s* has its raised portion 60 in a seventh angular position adjacent the sixth angular position, i. e., the angular position of the raised portion of contact cam 53*t*. This contact cam will control the production of record indications in transverse position or channel A on record receiving element 59 as shown in Fig. 3 of the drawings which channel is designated as MM.

For the purpose of causing cam 53*s* to produce so called "minute marks" on the record receiving element 59 once per minute, regardless of the tuning condition of the receiver 10, and also for the purpose of producing time information responsive to a separate time source, the resilient contact fingers 57*s* and 57*t* are connected by means of conductors 69 and 70 to a source of +B potential designated as 71, the conductor 69 being connected to this source through contacts 72*a* of a relay 72 having a winding 73. The conductor 70 on the other hand, is directly connected to this source of +B potential 71.

The time mark radio referred to above is illustrated as forming a part of the recorder 30 and is designated by the reference numeral 75. In accordance with the disclosure of the above mentioned Rahmel application this radio or wave signal receiver 75 is a fixed tuned receiver tuned to a particular transmitting station, preferably a clear channel station, located in the area in which the collaborator's home containing receiver 10 is located. As illustrated, this fixed tuned receiver 75 comprises an antenna ground circuit 76, a fixed tuned radio frequency amplifier 77, an oscillator modulator unit 78, an intermediate frequency amplifier 79, and a detector 80, all connected in tandem in the order named. Whenever the particular transmitting station to which the fixed tuned receiver 75 is tuned is broadcasting, or in other words, is "on the air," a signal is received by the receiver 75. The carrier of this signal is rectified by the detector 80, and appears across a resistor 81 as a direct current voltage. This voltage is applied as a negative bias to the grid of a suitable control tube 82. The plate circuit of the control tube 82 extends from the source of +B potential 71 through the winding 73 of the relay 72 to ground through a suitable grounding resistor 84.

The fixed tuned receiver 75 is illustrated as having a power supply section 86 including a primary winding 87 of a transformer which is connected to the source of alternating potential and specifically the conductors 31*a* and 31*b* through one of three parallel connected circuits. Specifically one terminal of the primary winding 87 is connected by means of a conductor 88 to the alternating current conductor 31*b*. The other terminal of the power transformer 87 is connected to the alternating current conductor 31*a* through either one of the following three circuit paths as follows: one, a circuit path through the contacts 89*a* of a thermal switch 89 and a conductor 90; two, a circuit path through a conductor 91, and a cover lock switch 92; and three, a circuit path through a conductor 93 and the contacts of an hour switch 94.

The purpose of these parallel arranged circuits will become apparent as the following description proceeds. The hour switch 94 is primarily for the purpose of permitting the receiver 75 to be turned off for substantial periods of time in order to increase the tube life thereof. Accordingly, the time mark radio 75 is turned on only for a few minutes during each hour or two hour period by means of the hour switch 94. The receiver 75 is specifically illustrated as capable of recording the "sign on" time rather than the "sign off" time for reasons which were brought out in the above mentioned copending Rahmel application and accordingly it is necessary that in the event that the receiver 75 is turned on and no signal is received from the fixed tuned receiver, to insure that the receiver 75 remains on until the "sign on" time of the transmitting station to which it is tuned occurs. To this end the relay 72 is provided with an additional set of contacts 72*b* which are closed when the time mark radio is on and no carrier is received. The relay 72 in Fig. 1*b* is indicated as in the position it would assume when the time mark radio is off or the time mark radio is on and carrier is being received thereby. Under either of these conditions the relay 72 is deenergized. If, however, the time mark radio is on and no carrier is received, no negative bias is applied to the control tube 82 and consequently the relay winding 73 is energized so as to open contacts 72*a* and close contacts 72*b*. When contacts 72*b* are closed +B potential is supplied to a resistor 89*b* associated with the thermal relay 89 and after a predetermined time the thermal relay 89 closes its contacts 89*a* so as to complete an energization circuit for the winding 87 even though the hour switch 94 subsequently opens this circuit after a few minutes' delay. It will be apparent that under these conditions relay 72 will remain energized until the "sign on" time of the transmitter to which the receiver 75 is always tuned. The reason a thermal relay 89 is employed in this parallel circuit connecting the transformer winding 87 to the power source is to prevent momentary lapses in carrier from causing the parallel circuit to be rendered effective through closure of the contacts 72*b*.

From the above discussion, it will be apparent that whenever the relay 72 is energized to close its contacts 72*b*, record indications will be produced in the transverse position or channel B of the record receiving element 59 and these record indications will continue to be produced until the transmitting station, to which the fixed tuned receiver 75 is tuned, comes back on the air. When this occurs, relay 72 will be deenergized and contact 72*b* opened. Thereafter no further record indication will be produced in transverse position B and the last record indication produced will be representative of the "sign on" time of the transmitter to which the fixed tuned receiver 75 is tuned.

The control circuit shown in Fig. 1*b* further includes a signal device generally indicated at 99 which may comprise one or both of a visual signal 100 and an audible signal 101. This signal device 99 is connected across the power source and specifically across conductors 31*a* and 31*b* through a switch 102 normally biased to the closed position by spring means 103. This switch 102 is referred to as a magazine switch and is normally held in the open position when a magazine 104 containing the record receiving element 59 is associated with the recorder 30. Upon removal of the magazine 104 from the recorder 30, the magazine switch 102 closes to render the signal means 99 effective thereby indicating to the collaborator that a new magazine should replace the magazine 104.

The recorder 30 is structurally illustrated in Fig. 2 of the drawings with the magazine 104 shown removed therefrom but in a position to be inserted into a magazine receptacle provided in the recorder 30. Since the details of the recorder 30 form no part of the present invention, no further consideration is given thereto except with respect to explaining the function of the cover lock switch 92 mentioned above. The recorder 30 includes a removable cover 106 which affords access to the various elements of the recorder, including the time mark radio 75. In view of the fact that the time mark radio 75 is only turned on for a few minutes during each hour, a field man who wanted to check the recorder 30, might have to spend an inordinate amount of time in order to check the time mark radio 75 if he had to wait for the next time the hour switch 94 closed. To this end the cover lock switch 92 is provided which is automatically closed when the cover 106 is removed so as to energize the time mark radio.

The details of construction of the recorder 30 form no part of the present invention. However, in order to fully describe the details of the invention, there is schematically illustrated in Figs. 1*a* and 1*b* certain operating mechanism for causing movement of the record receiving element 59 and the means actuated in response to energization of the winding 65 for producing record indications thereon. As illustrated, there is suitably disposed within the magazine 104 a supply spool 108 and a take-up spool 109. The record receiving element 59 is transferred from the supply spool 108 to the take-up spool 109 by virtue of a sprocket roller 110 having sprocket teeth thereon engageable with the edge perforations 61 in the record receiving element 59.

The sprocket roller 110 is synchronously driven from the motor 54 through gears 111, 112 and 113, and a shaft 114 having a clutching member 115 for making driving engagement with a cooperating clutching member 117 mounted on a shaft 118 which shaft 118 is drivingly related with the sprocket roller 110 by means of gears 120 and 121. The gear 112 preferably rotates at one revolution per hour and rotates a cam 122 having a raised portion 123 thereon for moving the hour switch 94 to the closed position for a few minutes, once during each hour. The take-up spool 109 is drivingly connected to the sprocket roller 110 by a suitable spring belt 130. Preferably the take-up spool 109 is over driven slightly by the spring belt 130 to maintain taut the record receiving element 59. A suitable brake illustrated in the form of a spring belt 131 engaging a stationary element 132 is associated with the supply spool 108 so as to apply a frictional drag thereto.

Any suitable means for producing record indications on the record receiving element 59 may be employed. As illustrated, there is provided a helical recording mechanism including the conventional raised helix 133 which is formed on a roller disposed on one side of the record receiving element 59 and rotated at one revolution per minute in synchronism with the code commutator switch 50 whereby the binary code record indications are made at the proper place transversely of the element 59. A suitable printer bar 135 pivotally mounted at 136 is disposed on the other side of the record receiving element 59. This printer bar is adapted to press the record receiving element against the helix 133. It will be obvious that depending upon the particular position of the helix, record indications will be produced on the record receiving element 59 in different transverse positions thereof. The printer bar 135 is preferably designed so as normally to be out of engagement with the record receiving element 59, and is provided with armature extensions 138 which are attracted to a stationary pole piece 139 associated with the winding 65 when the latter is energized thus causing the printer bar to move into record producing engagement with the helix 133. The pole piece 139 is a stationary part of the recorder while the printer bar 135 and the armature extensions 138 are associated with the magazine 104. When the magazine is in position the winding 65 is effective to actuate the printer bar 135. The record receiving element 59 may be coated with a suitable wax or similar material so that record indications may readily be produced thereon when the printer bar moves the element 59 against the helix 133.

It should be understood that any other type of recorder may be employed such, for example, as are disclosed in various ones of the above mentioned copending applications referred to earlier in this specification.

The clutching elements 115 and 117 are necessary in order to make and break the driving connection between the mechanism within the magazine 104 and the synchronous motor 54 depending upon whether or not the magazine 104 is associated with or removed from the recorder 30. When the magazine is removed from the recorder 30, the switch 102 closes to energize the signal means 99 thus warning the collaborator that another magazine should replace the magazine 104 just removed from the recorder 30. The magazine which has been removed is mailed to the analysis organization which will remove and process the record receiving element 59 and replace the same with a fresh record receiving element for subsequent use when the magazine 104 is again associated with a recorder.

It will be understood as has been mentioned above that the position switch 41 may preferably be a rotatable switch since the tuning apparatus of the wave signal receiver is normally rotary apparatus. In Fig. 4 of the drawings, there is illustrated a position switch 140 which corresponds in every detail to the position switch 40 except that a rotary shaft 141 is provided having a plurality of contact cams 43' designated as **43'*a*, 43'*b*, 43'*c*, 43'*d*, 43'*e*, 43'*f*, 43'*g*, 43'*h*, 43'*i*, 43'*j*, 43'*k*, 43'*m*, 43'*n*, 43'*o* and 43'*p*. The shaft 141 is suitably connected with the rotary mechanism of the wave signal receiver 10 as, for example, the tuning knob 38, by a Bowden wire 142, pulley 143 and gears 144 and 145, respectively. The other corresponding parts of the position switch 140 are designated by the same reference numerals as the switch 40** disclosed in Fig. 1*a* of the drawings. The wiper cam 41' corresponds to the linearly movable slidable contact 41 of the position switch 40.

In view of the detailed description included above, the operation of the system and apparatus of the present invention as well as the method of coding described, will readily be understood by those skilled in the art. The analysis organization will initially install the equipment in association with wave signal receivers located in the homes of collaborators. The apparatus associated directly with the receivers such as 10 is relatively small so as to be unnoticeable. The recorder will produce a record in binary code of the type shown in Fig. 3 whereby information with respect to the listening habits or viewing habits, in the case of television, of a wave signal receiver may readily be recorded and the binary code record indications lend themselves admirably to being supplied directly to electronic computors or the like.

While there has been shown and described a particular embodiment of the present invention, it is not desired that the invention be limited to the construction shown and described, for it will, of course, be obvious to those skilled in the art that changes and modifications may be made without departing from the invention in its broader aspects, and it is, therefore, aimed in the appended claims to cover all such changes and modifications as fall within the true spirit and scope of this invention.

What is claimed as new and desired to be secured by Letters Patent of the United States is:

1. Apparatus for recording the tuning condition of a wave signal receiver comprising in combination, a receiver attachment, a rotary position switch having a plurality of contacts disposed at said receiver attachment, means for relating said position switch with said receiver to render a different one of said contacts effective for each different transmitting station to which said receiver is tuned, a continuously rotating coding switch comprising a plurality of contacts connected to said position switch, said contacts of said coding switch being arranged to convert control signals produced by said position switch to electrical signals expressed in a binary code, and means for recording such electrical signals expressed in binary code.

2. A system for recording the tuning condition of a wave signal receiver having a movable tuning element capable of being selectively tuned to a plurality of different transmitting stations comprising in combination, a receiver attachment located adjacent said receiver, a position switch comprising a rotatable contact and a plurality of stationary contacts selectively engaged by said rotatable contact for different positions of said rotatable contact, said position switch being disposed in said receiver attachment, means for drivingly connecting said rotatable contact with said tuning element of said receiver to render a different one of said stationary contacts effective for each different transmitting station to which said receiver is tuned, a coding switch comprising a rotatable contact element and a plurality of stationary contacts connected to the stationary contacts of said position switch, means for continuously rotating said rotatable contact element, said rotatable contact element including means for engaging its associated stationary contacts in a selected manner to convert operation of said position switch to binary code signals indicative of the tuning condition of said receiver, and means for recording said binary code signals.

3. A system for recording the tuning condition of a wave signal receiver having a movable tuning element capable of being selectively tuned to a plurality of different transmitting stations comprising in combination, a receiver attachment located adjacent said receiver, a position switch comprising a rotatable contact and a plurality of stationary contacts selectively engaged by said rotatable contact for different positions of said rotatable contact, said position switch being disposed in said receiver attachment, means for drivingly connecting said rotatable contact with said tuning element of said receiver to render a different one of said stationary contacts effective for each different transmitting station to which said receiver is tuned, a recorder station remotely located with respect to said receiver attachment, a coding switch disposed at said recorder station and comprising a rotatable contact element and a plurality of stationary contacts, cable means extending between said receiver attachment and recorder station for interconnecting the stationary contacts of said coding and position switches, means for continuously rotating said rotatable contact element at one revolution per minute, said rotatable contact element including means for engaging different ones of the stationary contacts of said coding switch in a selected manner to convert operation of said position switch to binary code signals indicative of the tuning condition of said receiver, and means at said recorder station for recording said binary code signals.

4. A system for recording the tuning condition of a wave signal receiver having a movable tuning element capable of being selectively tuned to a plurality of different transmitting stations comprising in combination, a receiver attachment located adjacent said receiver, a position switch comprising a rotatable contact and a plurality of stationary contacts selectively engaged by said rotatable contact for different positions of said rotatable contact, said position switch being disposed in said receiver attachment, means for drivingly connecting said rotatable contact with said tuning element of said receiver to render a different one of said stationary contacts effective for each different transmitting station to which said receiver is tuned, a recorder station remotely located with respect to said receiver attachment, a coding switch disposed at said recorder station and comprising a rotatable contact element and a plurality of stationary contacts, cable means extending between said receiver attachment and recorder station for interconnecting the stationary contacts of said coding and position switches, means for continuously rotating said rotatable contact element at one revolution per minute, said rotatable contact element including means for engaging associated stationary contacts in a selected manner to convert operation of said position switch to binary code signals indicative of the tuning condition of said receiver, means at said recorder station including a record producing element, and means for rendering said record producing element effective in response to said binary code signals.

5. A system for recording the tuning condition of a wave signal receiver having a movable tuning element capable of being selectively tuned to a plurality of different transmitting stations comprising in combination, a receiver attachment located adjacent said receiver, a position switch comprising a rotatable contact and a plurality of stationary contacts selectively engaged by said rotatable contact for different positions of said rotatable contact, said position switch being disposed in said receiver attachment, means for drivingly connecting said rotatable contact with said tuning element of said receiver to render a different one of said stationary contacts effective for each different transmitting station to which said receiver is tuned, a recorder station remotely located with respect to said receiver attachment, a coding switch disposed at said recorder station and comprising a rotatable contact element and a plurality of stationary contacts, cable means extending between said receiver attachment and recorder station for interconnecting the stationary contacts of said coding and position switches, means for continuously rotating said rotatable contact element at one revolution per minute, said rotatable contact element including means for engaging associated stationary contacts in a selected manner to convert operation of said position switch to binary code signals indicative of the tuning condition of said receiver, means at said recorder station comprising a record producing means for producing a record on selected portions of a record receiving element, and means for energizing said record producing means in response to operation of said coding switch.

References Cited in the file of this patent

UNITED STATES PATENTS

| | | |
|---|---|---|
| 1,930,525 | Levy | Oct. 17, 1933 |
| 2,213,886 | Potter | Sept. 3, 1940 |
| 2,249,324 | Potter | July 15, 1941 |
| 2,337,568 | Owens | Dec. 28, 1943 |
| 2,342,167 | Potter | Feb. 22, 1944 |
| 2,397,604 | Hartley et al. | Apr. 2, 1946 |
| 2,484,734 | Rahmel | Oct. 11, 1949 |
| 2,510,121 | Lehmann | June 6, 1950 |
| 2,514,086 | Owens | July 4, 1950 |
| 2,575,342 | Gridley | Nov. 20, 1951 |
| 2,645,549 | Bateman et al. | July 14, 1953 |